United States Patent [19]

Spirk

[11] Patent Number: 4,621,211
[45] Date of Patent: Nov. 4, 1986

[54] ELECTRICAL MACHINE BRUSHES AND SLIPRINGS WITH BRUSH DUST COLLECTING APPARATUS

[75] Inventor: Franz Spirk, Berlin, Fed. Rep. of Germany

[73] Assignee: Siemens Aktiengesellschaft, Munich and Berlin, Fed. Rep. of Germany

[21] Appl. No.: 731,117

[22] Filed: May 6, 1985

[30] Foreign Application Priority Data

May 11, 1984 [DE] Fed. Rep. of Germany ....... 3418014

[51] Int. Cl.$^4$ ............................................. H02K 9/28
[52] U.S. Cl. .................................... 310/232; 15/339; 310/239
[58] Field of Search ...................... 310/62, 88, 89, 227, 310/228, 219, 232, 238, 239, 242; 15/339

[56] References Cited

U.S. PATENT DOCUMENTS

| | | | |
|---|---|---|---|
| 716,476 | 12/1902 | Read | 310/239 |
| 2,284,656 | 6/1942 | Heter | 310/227 |
| 2,910,717 | 11/1959 | Raymond | 15/339 |
| 4,019,218 | 4/1977 | Cyphert | 310/239 |
| 4,137,474 | 1/1979 | Krieger | 310/232 |

FOREIGN PATENT DOCUMENTS

| | | | |
|---|---|---|---|
| 679203 | 4/1930 | France | 310/227 |
| 744126 | 4/1933 | France | 310/239 |

*Primary Examiner*—Patrick R. Salce
*Assistant Examiner*—D. L. Rebsch
*Attorney, Agent, or Firm*—F. W. Powers; J. L. James

[57] ABSTRACT

An electrical machine in which power is supplied to the rotor via brushes and sliprings having an improved brush-dust suction apparatus, including brush supports and ring-shaped collecting chambers which are penetrated by brush bolts. The suction openings of these collecting chambers circumscribe the slipring in a ring pattern. Each collecting chamber is connected by thick-walled glass cylinders to a common collecting chamber, which is connected to a negative pressure source, when the air and the brush dust entrained in the air is conveyed to an exterior chamber. The brush supports are fastened by insulators to the collecting chamber and are mutually reinforced by insulator bolts.

14 Claims, 2 Drawing Figures

ELECTRICAL MACHINE BRUSHES AND SLIPRINGS WITH BRUSH DUST COLLECTING APPARATUS

BACKGROUND OF THE INVENTION

This invention relates to the field of electrical machines powered through brushes and sliprings, and more particularly to electrical brush-and-slipring machines provided with chambers running in a ring-shaped pattern circumferentially outward from the sliprings for collecting the dust from the brushes. These collecting chambers are connected to a negative pressure source into which air and brush dust are drawn via the collection chamber suction openings located immediately adjacent to the mounting surfaces of the brushes, and mechanically fastened to brush supports. The brush dust and the air it is contained in are then conveyed to an exterior chamber via a common collecting chamber.

An electrical machine with an apparatus that draws off brush dust and simultaneously cools the sliprings, is known from DE-OS No. 21 23 278. In this known unit, the ring-shaped collection chambers to draw off the brush dust and the cooling air are located on the brush side facing away from the brush supports. They are each connected to radially oriented, pipe-shaped suction channels which extend from the brush to the surface of the slipring, thus forming the suction opening located immediately before the brush mounting surface. The slipring surface is designed with threaded grooves which lead to the suction openings. As the suction openings are restricted to the brush area in the circumferential direction only, the possibility still exists that residual dust remaining in the grooves of the slipring could penetrate to the interspatial area between the suction openings in the slipring area and could be deposited on the machine's insulating parts, thus forming, by a known manner, leakage current paths which reduce the effective dielectric strength. Moreover, in this known machine access to the brushes from both sides for maintenance and equipment checking purposes is impeded. Accordingly, it will be appreciated that it would be highly desireable to provide an electrical machine where the suction openings form unbroken rings, circumferentially located to the slip rings and brushes and, in conjunction with the brushes and sliprings, operate to collect all the brush dust.

It is an object of this invention to improve the brush dust suction arrangement for an electrical machine to reliably draw off all the brush dust. It is a further object of this invention that access to the brushes not be more impeded than the typical normal design without a suction arrangement.

SUMMARY OF THE INVENTION

Briefly stated, in accordance with one aspect of the invention, the foregoing objects are achieved by providing an electrical brush-and-slipring machine designed with ring-shaped collecting chambers which are connected to and arranged within the middle of the brush supports. The brush supports are fastened by means of two insulators to the common collecting chamber. The collection chambers are further penetrated by the brush bolts. The suction openings of the ring-shaped collecting chambers similarly surround each slipring on each side with a ring pattern. Each ring-shaped collecting chamber is connected by a minimum of one thick-walled glass cylinder to a common collecting chamber.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings:

DESCRIPTION OF THE PREFERRED EMBODIMENT

By the arrangement of the ring-shaped collecting chamber within the brush supports there is no additional spacial requirement for the brush dust suction device aside from the brush so that their accessibility is assured, as is the case for normal units without such mechanisms. Since the brush bolts penetrate the ring-shaped collecting chambers, these are mechanically stiffened so that the brush supports in the area of the collecting chambers can be designed with correspondingly thin walls. The danger of a deposit of brush dust along the brush bolts is hardly a factor, given their round smooth surface and in addition, no further external leakage path can arise at that point.

Since the suction opening extends in a ring pattern around the slipring, the brush dust is evenly drawn off along the entire circumference of the slipring. The arrangement of the collecting chambers within the brush support, however, necessitates an insulation of the air and dust removal lines in the common additional collecting chamber. Said insulation, however, can be effected beneath the slipring arrangement where there is adequate open space for the necessary insulator spacing. There each brush support itself is also fastened to the common collecting chamber via two insulators. The insulation of the air and dust removal is effected in each ring-shaped collecting chamber by means of a minimum of one thick-walled glass cylinder. As is well known, carbon dust deposits itself only poorly on glass surfaces so that the danger of a leakage current path formation due to a buildup along the inner surfaces of the glass cylinder is very slight. In addition, the glass cylinder provides the advantage that an optical check of the internal cleanliness of the glass cylinder is feasible.

Since in an electrical machine designed in accordance with this invention deposits of brush dust within the slipring chamber are avoided with certainty due to the even suction along the entire circumference of the sliprings, the maintenance intervals for the operation of the machine can be extended, thereby extending its availability.

It is particularly advantageous to mount the brushes and sliprings in pairs and then to place the brush support with the ring-shaped collecting chamber always in between the two, providing for the brush dust suction device to be designed in a particularly space-saving fashion. For additional mechanical stiffening of both the brush support mounts and the brush suction device it is recommended that the brush supports be interconnected by insulating bolts.

Figure 1:
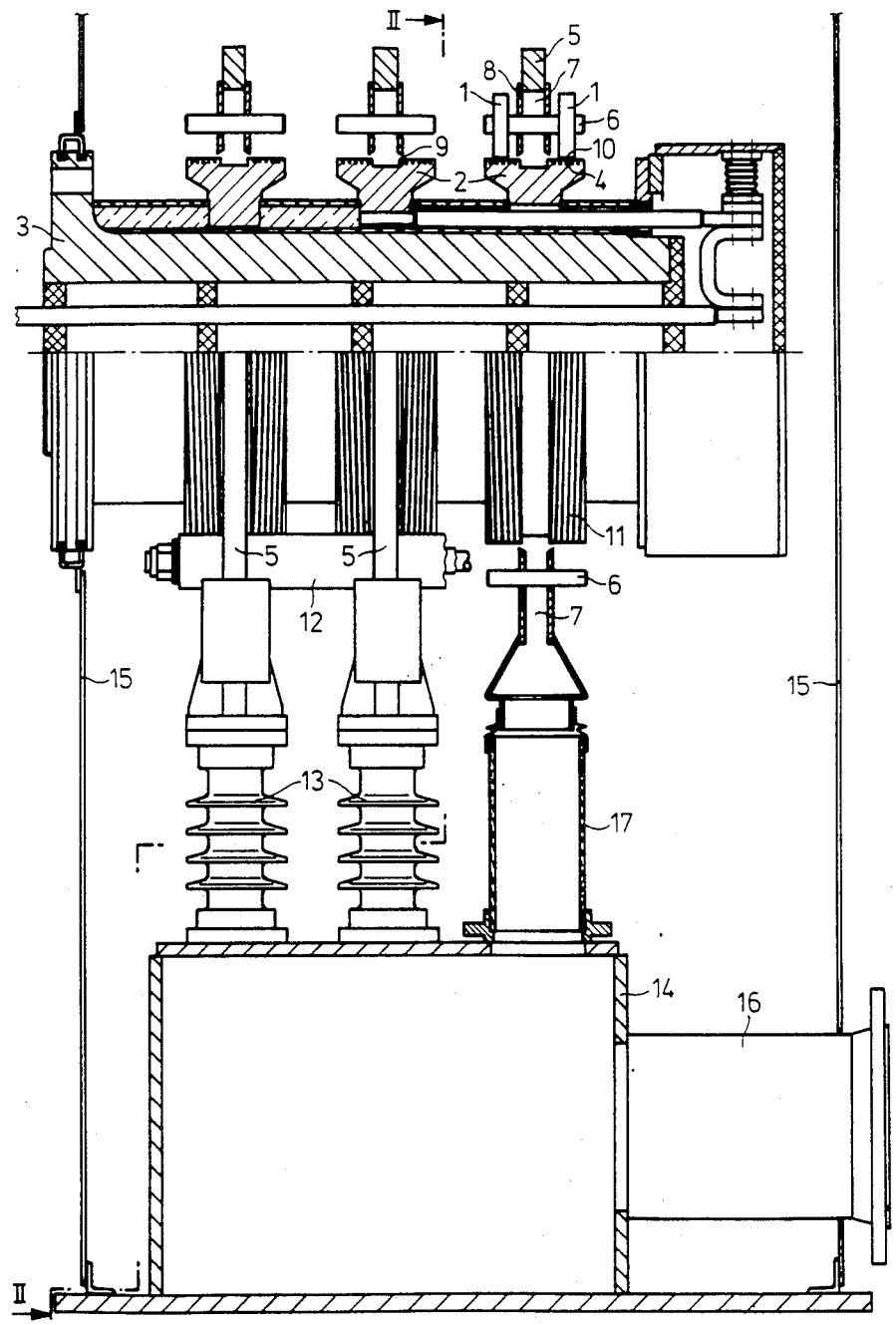
FIG. 1 illustrates a simplified diagrammatical partially cut away view of the invention.
Figure 2:
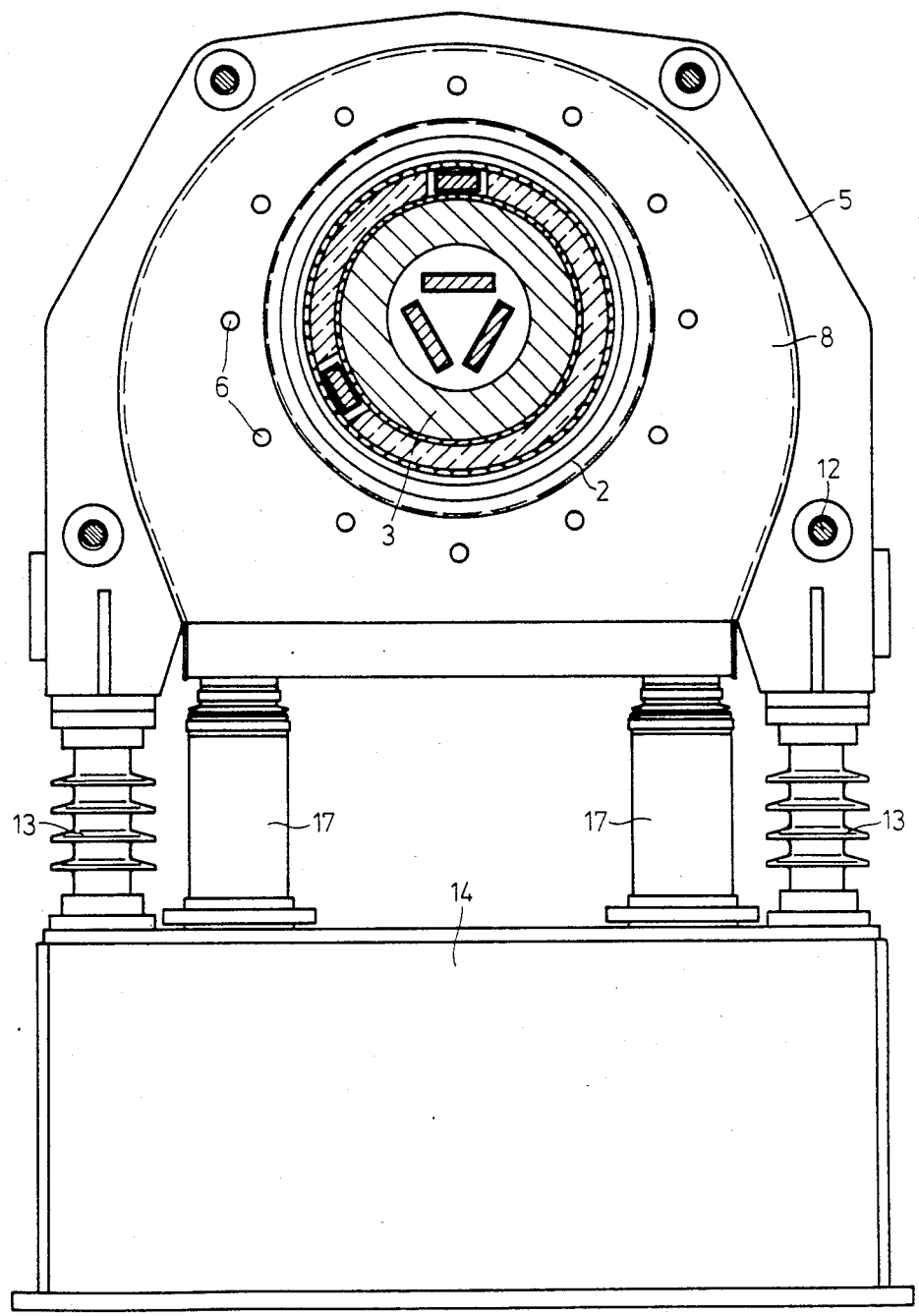
FIG. 2 illustrates a radial cross section along II—II of FIG. 1 with brushes not shown for simplication.

FIGS. 1 and 2 show an electrical machine such as an electrical motor with a slipring rotor. Corresponding item numbers designate the same item shown in the different views. Current is transmitted to the rotor via brushes 1 and sliprings 2. Each of the sliprings 2 of the three phases of the rotor winding are arranged in pairs of the rotor shaft 3, or the slipring surface 4 is divided in the middle, and two brushes 1 are arranged at the brush support 5 located in the middle and are borne by a brush bolt 6. The brushes 1 in FIG. 1 are only schematically indicated, without showing the specific fastening devices between the brush bolt 6 and brush 1.

In order for the interval between the necessary maintenance of the brushes to be extended to the maximum extent, the unit includes a device to draw off the brush dust generated by the brush abrasion during operation of the unit. Said device contains ring-shaped collecting chambers 7 located in the interior of the brush support 5. The ring-shaped collecting chambers 7 are formed by welding thin-walled plates 8 to the solid portion of the brush support 5. Said plates 8 are penetrated by the brush bolt 6 and thus mutually reinforced. The collecting chambers 7 or the plates 8 surround the sliprings 2 in a ring pattern and have along the entire circumference on each side a similarly ring-shaped suction opening 9 located directly next to the brush mounting surfaces 10. To support the passage of the brush dust to the suction opening 9, slipring 2 features only schematically depicted grooves 11, which run in a threaded pattern always in reference to the direction of rotation to the suction opening 9.

The brush supports 5 of the three phases of the rotor winding are mutually interconnected by several insulator bolts 12 distributed along the circumference for mechanical stiffening purposes. Since the voltage between the phases of the rotor winding can be relatively large, each brush support 5 is supported via two insulators 13 along the common collecting chamber 14 for the sucked-off air which entrains the brush dust. This collecting chamber 14 is located beneath the slipring and brush arrangement and is enclosed by walls 15 which— shown only schematically—are drawn in broken lines and which in fact surround the entire slipring chamber and the brush arrangement. Within the walls 15 of the enclosure, not shown, entry openings are provided which are designed for cooling air to be sucked in. These openings are equipped with a filter so that the penetration of contaminants can be avoided. The collecting chamber 14 is joined to a connector 16 leading to the chamber outside the enclosure, in which the also-not-shown suction fan can be mounted, which serves as the source of the negative pressure for the brush dust suction device.

The ring-shaped collecting chambers 7 in the brush support 5 have varied cross-sections in accordance with the volume of the sucked-in, dust-containing air, which becomes larger in the direction of the common collecting chamber 14. The linkage between the ring-shaped collecting chamber 7 and the common collecting chamber 14 is defined by two thick-walled glass cylinders 17 which thus form the insulation. As is well known, brush dust deposits itself poorly on a glass surface; therefore the danger that the necessary insulation will be bridged here by a layer of carbon dust formed on the inner surface of the glass cylinder 17 is very slight. In addition, the transparency of the glass permits checking of the internal surfaces so that any contamination of the internal surface of the glass cylinder 17 can be recognized in time.

Due to this brush-dust suction apparatus which, due to the positioning of the collecting chambers 7 within the brush supports 5, requires no additional space, the brush dust abraded during the machine's operation is evenly sucked off along the entire circumference of the sliprings 2. It passes through the interior of the glass cylinder 17 into the common collecting chamber 14 and is then conveyed into the open air by the connector 16. Thereby the system prevents any deposit of the abraded bush dust at undesirable points where leakage current paths can form. The intervals between necessary maintenance work on the brushes are thus determined exclusively by the brushes themselves. It will now be understood that there has been disclosed an improved brush and slipring electrical machine suction cleaning apparatus. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. An electrical machine with power supplied through brushes and sliprings to the rotor having a brush dust collecting apparatus comprising:
   a plurality of brush supports, one for each said slipring, each circumferentially located to each respective slipring; each surrounding a respective ring-shaped dust collecting chamber circumferentially located to each respective slipring;
   two circumferential openings between each said slipring and each respective brush support to the respective dust collecting chamber;
   suction means connected to said ring-shaped brush dust collecting chambers to draw in air and airborne brush dust from said sliprings and said brushes;
   a common collecting chamber connected to said ring-shaped brush dust collecting chambers and to said suction means to receive and collect said air and airborne brush dust;
   a plurality of insulators fastening said brush supports to said common collecting chamber;
   a plurality of brush bolts, each penetrating one of said brush supports and one of said ring-shaped dust collecting chambers for pairwise mounting of said brushes on each side of said brush dust collecting chamber adjacent to the circumferential opening; and
   at least one thick-walled glass cylinder connecting each of said ring-shaped dust collecting chambers to said common collecting chamber.

2. An electrical machine according to claim 1, wherein said brushes are arranged in pairs with said slipring, having said brush support and said ring-shaped collecting chamber always positioned in the middle thereof.

3. Electrical machine according to claim 1, wherein said sliprings are provided with threaded grooves running towards said circumferential opening.

4. Electrical machine according to claim 2, wherein said sliprings are provided with threaded grooves running towards said circumferential opening.

5. An electrical machine according to claim 1, wherein the cross-section of the ring-shaped collecting chambers along the circumference increases in the direction of the common collecting chamber.

6. An electrical machine according to claim 2, wherein the cross-section of the ring-shaped collecting chambers along the circumference increases in the direction of the common collecting chamber.

7. An electrical machine according to claim 1, further comprising a plurality of insulator bolts mutually interconnecting said brush supports.

8. An electrical machine with power supplied through brushes and sliprings to the rotor, the brushes of each said sliprings being mounted by brush bolts on a brush support surrounding said slipring, having a brush dust collecting apparatus comprising:

a plurality of ring shaped brush dust collecting chambers circumferentially located to each of said sliprings, each said chamber having two circumferential openings between said chamber and each said slipring, proximately located to said slipring and said brushes;

suction means connected to said ring-shaped brush dust collecting chambers to draw in air and brush dust from said sliprings and said brushes;

a common collecting chamber connected to said ring-shaped brush dust collecting chambers and to said suction means to receive and collect said air and brush dust;

a plurality of insulators fastening said brush supports to said common collecting chamber;

each one of said ring-shaped dust collecting chambers being located in the interior of said brush supports and being penetrated by said brush bolts for pairwise mounting of said brushes on each side of said brush dust collecting chamber adjacent to the circumferential opening; and at least one thick-walled glass cylinder connecting each of said ring-shaped dust collecting chambers to said common collecting chamber.

9. An electrical machine according to claim 8, wherein said brushes are arranged in pairs with said slipring, having said brush support and said ring-shaped collecting chamber always positioned in the middle thereof.

10. Electrical machine according to claim 8, wherein said sliprings are provided with threaded grooves running towards said circumferential opening.

11. Electrical machine according to claim 9, wherein said sliprings are provided with threaded grooves running towards said circumferential opening.

12. An electrical machine according to claim 8, wherein the cross-section of the ring-shaped collecting chambers along the circumference increases in the direction of the common collecting chamber.

13. An electrical machine according to claim 9, wherein the cross-section of the ring-shaped collecting chambers along the circumference increases in the direction of the common collecting chamber.

14. An electrical machine according to claim 8, further comprising a plurality of insulator bolts mutually interconnecting said brush supports.

* * * * *